Figure 1:
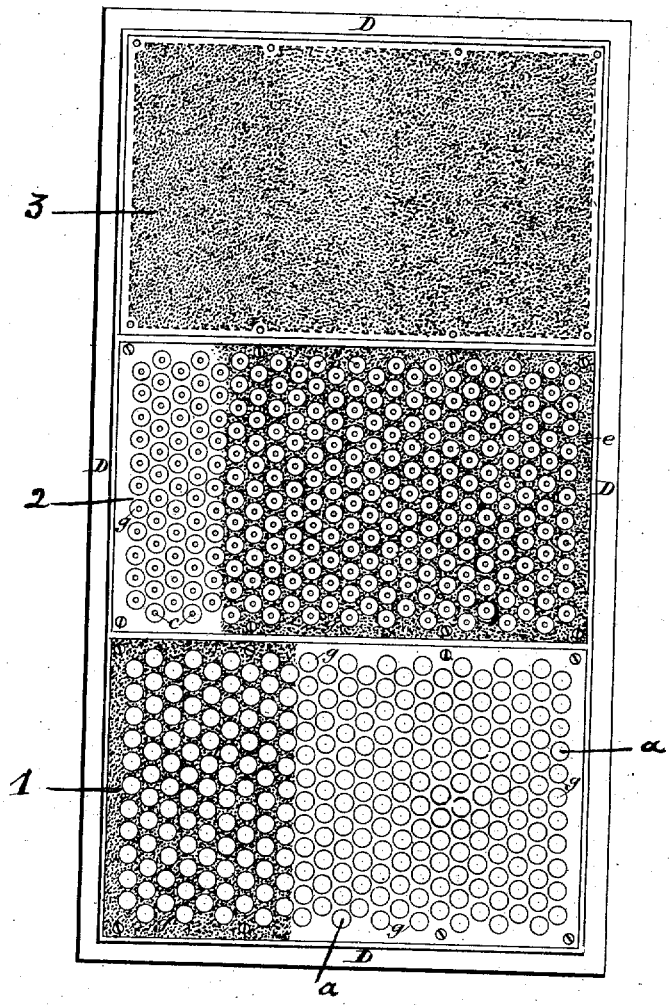

3 Sheets—Sheet 1.

T. HYATT,

Assignor to E. A. L. HYATT.

Mode of Covering, Lighting, and Ventilating Areas, Vaults, and similar Underground Spaces.

No. 9,534. Reissued Jan. 11, 1881.

Thaddeus Hyatt

INVENTOR

WITNESSES:

W. W. Rockwood

A. Moore

THE NORRIS PETERS CO., WASHINGTON, D. C.

3 Sheets—Sheet 2.
T. HYATT,
Assignor to E. A. L. HYATT.
Mode of Covering, Lighting, and Ventilating Areas, Vaults, and similar Underground Spaces.
No. 9,534. Reissued Jan. 11, 1881.
FIG. II.
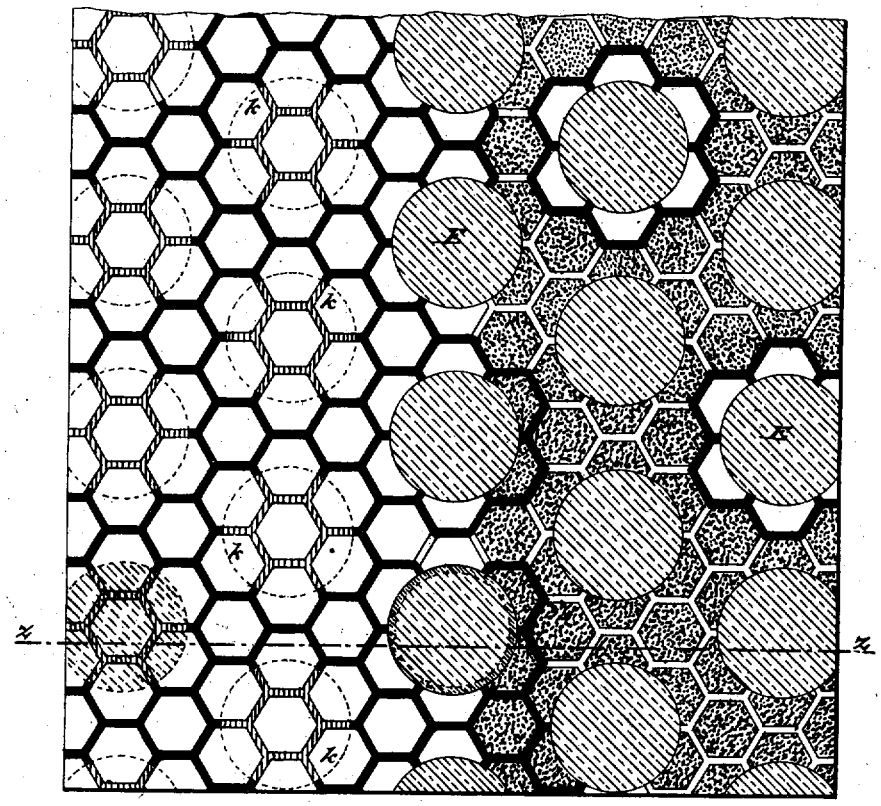
FIG. III.
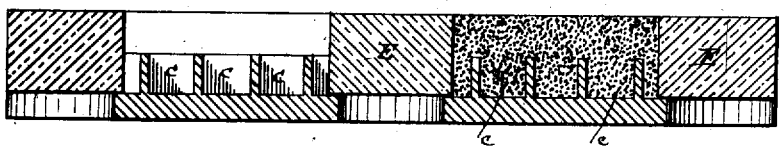
Madden Hyatt
INVENTOR:
WITNESSES:
Thos. W. Rockwood
A. Moore
THE NORRIS PETERS CO., WASHINGTON, D. C.

T. HYATT,
Assignor to E. A. L. HYATT.
Mode of Covering, Lighting, and Ventilating Areas, Vaults, and similar Underground Spaces.
No. 9,534. Reissued Jan. 11, 1881.
FIG. IV.
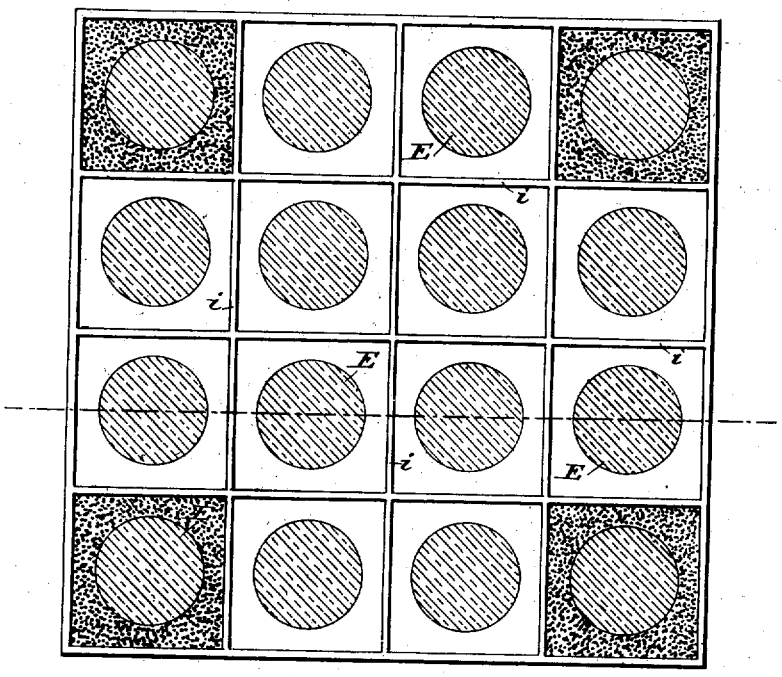
FIG. V.
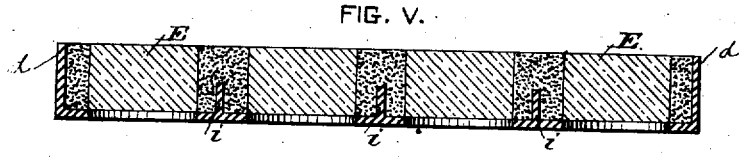
Thaddeus Hyatt
INVENTOR:
WITNESSES:
W. Mahwood
A. Moore
THE NORRIS PETERS CO., WASHINGTON, D. C.

UNITED STATES PATENT OFFICE.

THADDEUS HYATT, OF NEW YORK, N. Y., ASSIGNOR TO ELIZABETH A. L. HYATT, OF SAME PLACE.

MODE OF COVERING, LIGHTING, AND VENTILATING AREAS, VAULTS, AND SIMILAR UNDERGROUND SPACES.

SPECIFICATION forming part of Reissued Letters Patent No. 9,534, dated January 11, 1881.

Original No. 206,571, dated July 30, 1878. Application for reissue filed December 21, 1880. Patented in England October 2, 1869.

*To all whom it may concern:*

Be it known that I, THADDEUS HYATT, of the city, county, and State of New York, am the inventor of an Improved Mode of Covering, Lighting, and Ventilating Areas, Vaults, and Similar Underground Spaces, applicable also as a footway, which invention was patented by me in England on the 2d day of October, 1869, No. 2,869, of which the following is a specification.

The English patent aforesaid describes a "beam-platform" or area-covering composed of a foundation or cast-iron frame made to receive panels or plates of iron, with an asphalted surface, these plates not only being asphalted, but also the face of the iron frame containing them, especially when the external portions or borders of the frame were designed to form a coping in place of stone.

The object of the asphalt, as explained in the text, is to prevent slipping, and two kinds of asphalt are mentioned—viz., natural and artificial—natural asphalt, as is well known, being a bituminous concrete, or limestone infiltrated with bitumen, and artificial asphalt being any combination of tar or bituminous materials with sand, gravel, and the like, the latter being adapted to an iron surface moderately rough, or even smooth, according to the thickness of the material, and the former being adapted only to a surface formed to give or produce side adhesion or support upon lines vertical to the face of the iron plate—such, for example, as would be formed by casting the face of the plate in the form of cells of hexagon or other shape.

The face of the metal construction when made to be asphalted is described as thus made: The iron plates or panels, combined with the metal frame to form the area-covering, are described as of three kinds—one where the apertures are set with glass, another where they are left open to let in air, and a third which is solid.

Figure I represents an area-covering or beam-platform; D, the cast-iron frame. 1 2 3 are the panels, 1 being a glazed plate or set with glasses, *a a* being the glasses or bull's-eyes. Plate 2 has air-holes instead of glasses. 3 is a solid iron plate. The portion shaded by dots represents asphalt.

Fig. II represents a portion of panel 1, and is designed to show the cellular construction of the face of the metal, as described in the English patent. The light-holes *k k*, made through the plate, are made with no reference to getting the center of each glass E exactly at the center of any particular cell or cluster of cells, inasmuch as the cells do not appear on the surface, being covered up by the asphalt, the purpose of the cellular face being to produce a large superficial area or surface for the asphalt to cling to. For this reason, also, the cells, of preference, are made smaller than the glasses E, so that the light-hole cuts into a cluster of cells. Each cluster of cells, as shown, represents a hexagon cell as large as the combined cells that form the cluster, and each cluster is more or less perfect, according to the extent that one cluster cuts into another; but this makes no difference as to the object of the cells. Where preferred, the glasses may be so arranged as to bring the center of each glass exactly at the center of the cluster of cells through which the light-hole is made, which light-holes are indicated by the dotted circles *k k*.

Fig. III is a cross-section of 2 on the line *z z*. The asphalt (shown by the dots) covers the cells *c c c*, so that no part of the metal sides thereof appears at the top, the only metal of the plate that shows at the surface being the sides. (Not shown.)

Fig. IV represents, in plan, and Fig. V, in cross-section, a cellular face, made by cross-ribs *i i*, which may be kept below the face of the asphalt, as shown, or be brought to the top like the sides *d d*, and form a portion of the walking-surface, along with the asphalt and the glasses, in manner substantially as such plates were put to use in the city of New York by me as vault-covers, with knobs of iron on the surface, between the years 1850–54. The invention consisted in a new mode of fixing glasses in gratings or perforated plates by the aid of a bituminous bond, the bituminous substances employed, as mentioned, being asphaltum properly modified by coal-tar, coal-tar mixed with sulphur, also coal-tar mixed with sulphur and sand, or sulphur and marble-dust. The caveat also reads as follows, viz: "A further object I have in view is this—viz., to expose as large a surface as possible of this asphaltic bond between the glasses and even with their surfaces, so as to make a more tractionable surface to the foot than iron, (when used as illuminating-flagging,) and consequently less liable to be slipped on in walking."

Having thus fully described and illustrated my invention, what I claim, and desire to secure by Letters Patent, is—

1. Illuminating-gratings or perforated metal plates set with glasses by means of an asphalt or equivalent bond put about the glasses in fluid or plastic state, which on setting and hardening not only confines the glasses to the grating or plate and forms a water-tight joint around each glass, but also at the same time produces between the glasses a non-slipping or safe-walking foot-surface, substantially as and for the purposes herein set forth, and illustrated by my drawings.

2. Illuminating-gratings or perforated metal plates set with glasses sunk within the body of the metal as to their lower sections and therein held by means of suitable cement or material, in combination with a body of asphalt or equivalent foot-holding substance put upon the grating or plate in the spaces between the upper sections of the glasses in a fluid or plastic state, substantially as and for the purposes herein set forth, and illustrated by my drawings.

3. Illuminating-gratings or perforated metal plates formed with a retaining cellular or recessed face, combined with glasses and an asphalt or equivalent foot-holding filling, substantially as and for the purposes herein set forth, and illustrated by my drawings.

THADDEUS HYATT.

Witnesses:

GEO. M. LOCKWOOD,

A. MOORE.